H. G. PORTER'S HAY ELEVATOR.
75193
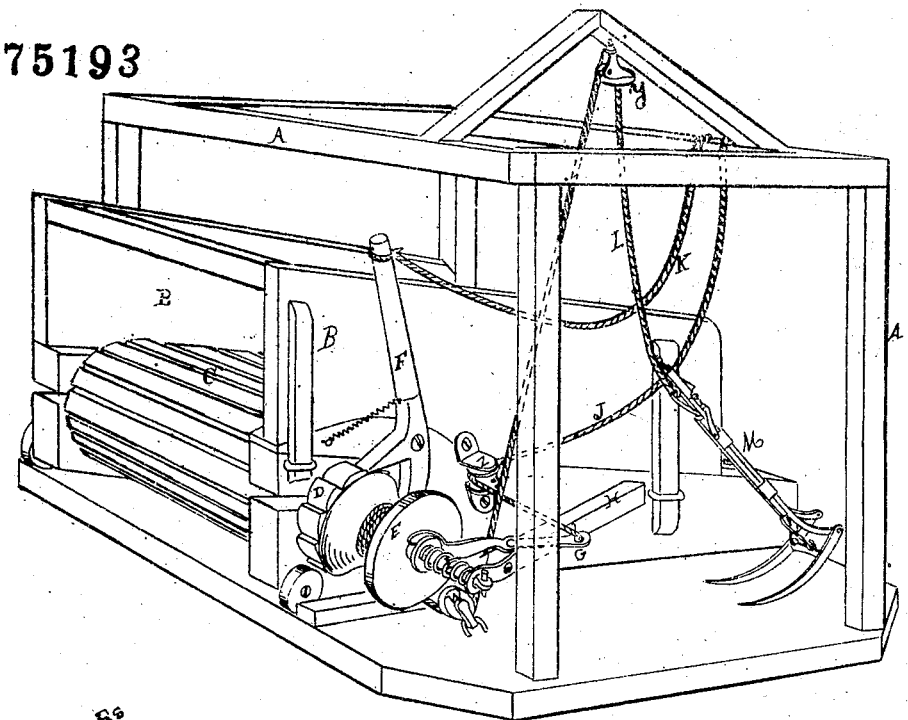
PATENTED
MAR 3 1868
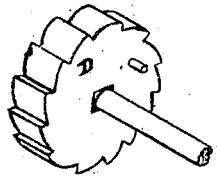
Witnesses
Inventor,
H. G. Porter
her
Alexander J. Mason
Atty.

UNITED STATES PATENT OFFICE.

HENRY G. PORTER, OF GRAND RAPIDS, MICHIGAN.

Letters Patent No. 75,193, dated March 3, 1868.

IMPROVEMENT IN HAY-ELEVATORS.

The Schedule referred to in these Letters Patent and making part of the same.

TO ALL WHOM IT MAY CONCERN:

Be it known that I, HENRY G. PORTER, of Grand Rapids, in the county of Kent, and in the State of Michigan, have invented certain new and useful Improvements in Hay-Elevators; and do hereby declare that the following is a full, clear, and exact description thereof, reference being had to the accompanying drawings, and to the letters of reference marked thereon.

In the annexed drawings, making part of my specification, A represents the frame of a building into which the hay is to be placed, and within this frame is placed a horse-power, B B, working by means of the tread or endless wheel C. One of the shafts around which this endless-tread wheel passes extends beyond the frame of the power B, and has upon it ratchet-wheel D and a spool or drum, E. The ratchet-wheel is made fast to the shaft, while the spool is loose upon it. One face of the wheel, however, is provided with pins or lugs, which take into holes in one end of the spool for the purpose of stationing it, when desirable, upon the shaft. A spring, I, is used on the end of the shaft for pressing the spool up against the ratchet-wheel, and a pronged lever, which catches in a groove at the outer end of the spool, serves to draw it outward and out of connection with the wheel. J represents a cord, which is secured to one end of lever G, for operating said lever and the spool, and passes around a pulley at z to a convenient position for the operator. L represents a cord, by means of which the fork is raised and lowered. One end of this cord is secured to the spool E, and the other, after passing under a pulley at w, and then over a pulley, y, at the top of the frame A, is made fast to the upper end of the fork. H represents a brace to the outer end of the shaft upon which the spool plays.

When the horses work the endless wheel C, the shaft upon which the spool is placed revolves, and the spool being secured to the ratchet-wheel revolves with it, winding the cord L around it, and thus drawing up the fork with its load of hay. The pawl-lever F, catching into the teeth of wheel D, prevents the shaft from revolving backwards at any time. When the hay has been raised to the proper height, and then deposited, the operator throws the spool out of gear with the ratchet-wheel, so that said spool will revolve backwards for the purpose of lowering the fork again.

The fork is composed mainly of two bars of iron, N and P. The bar P has two keepers, a a, upon it, which surround the bar N, and thus confine the two together. The lower end of bar N is pronged, and to each of these prongs is pivoted a tine, O O. These tines are separated and held apart by means of a suitable cross-bar or rung. Rods d connect the lower end of bar P to the cross-bar of the tines, so that the moving of the bar P causes the tines to rise and fall. e and i represent two clevises, which are pivoted together at one end. The end of one of these clevises is pivoted to the bar P, and the end of the other is pivoted to the bar N. When the pivot which connects the two clevises is raised until it lies against the bar N above the point where clevis i is pivoted to it, the tines O are elevated, so as to hold hay when placed upon them, and the several pivots, being in line or on a dead-point, said tines cannot fall until the clevises are shifted out of this position, and the dead-point overcome. This is effected by a wedge-shaped slide, S, which is held up by a spring which surrounds its upper end, and is drawn down by a cord, which is tied in a hole at x. This bar plays in a keeper in the upper end of bar N. The cord L is attached to the fork at T.

In elevating hay, the clevises e and i are raised until the tines of the fork are in the position seen in fig. 1. The hay is then placed upon them, and the fork is drawn up, as has been described. The hay is discharged by drawing down bar S until it shifts the position of the clevises. As soon as this occurs, the weight of hay straightens out the tines, so that it readily drops off.

Having thus fully described my invention, what I claim is—

1. The arrangement of the horse-power, with the ratchet-wheel D, spool E, pawl F, lever G, and cords J and K, substantially as and for the purpose set forth.

2. The combination of the fork with the horse-power, ratchet-wheel D, spool E, pawl F, lever and cords, when the parts are arranged and operating substantially as and for the purposes set forth.

In testimony that I claim the foregoing, I have hereunto set my hand, this ninth day of January, 1868.

HENRY G. PORTER.

Witnesses:
B. F. SPOFFORD,
OMAR H. SIMONDS.